(12) United States Patent
Thibault et al.

(10) Patent No.: US 12,393,042 B2
(45) Date of Patent: Aug. 19, 2025

(54) DUAL FIELD OF VIEW OPTICAL SYSTEM

(71) Applicant: ImmerVision, Inc., Montreal (CA)

(72) Inventors: Simon Thibault, Quebec City (CA); Jocelyn Parent, Lavaltrie (CA); Patrice Roulet, Montreal (CA); Zhenfeng Zhuang, Montreal (CA); Xavier Dallaire, Verdun (CA); Xiaojun Du, Montreal (CA); Pierre Konen, Saint-Bruno (CA)

(73) Assignee: IMMERVISION, INC., Montreal (CA)

( * ) Notice: Subject to any disclaimer, the term of this patent is extended or adjusted under 35 U.S.C. 154(b) by 353 days.

(21) Appl. No.: 17/890,502

(22) Filed: Aug. 18, 2022

(65) Prior Publication Data

US 2023/0057977 A1    Feb. 23, 2023

Related U.S. Application Data

(60) Provisional application No. 63/318,874, filed on Mar. 11, 2022, provisional application No. 63/235,405, filed on Aug. 20, 2021.

(51) Int. Cl.
G02B 27/10    (2006.01)
G02B 17/08    (2006.01)

(52) U.S. Cl.
CPC ....... G02B 27/106 (2013.01); G02B 17/0856 (2013.01); G02B 27/1073 (2013.01)

(58) Field of Classification Search
CPC .............. G02B 27/106; G02B 17/0856; G02B 27/1073

(Continued)

(56) References Cited

U.S. PATENT DOCUMENTS

| 2,200,467 | A | 5/1940 | Cristiani |
| 5,191,203 | A | 3/1993 | McKinley |

(Continued)

FOREIGN PATENT DOCUMENTS

| CH | 266144 A | 1/1950 |
| CN | 111208089 A | 5/2020 |

(Continued)

OTHER PUBLICATIONS

International Search Report and Written Opinion issued Nov. 9, 2022 in International Application No. PCT/IB2022/057770.

(Continued)

*Primary Examiner* — William Choi
(74) *Attorney, Agent, or Firm* — Panitch Schwarze Belisario & Nadel LLP

(57) ABSTRACT

A method for designing an optical system creating at least two optical images with different field of view on a common image plane. The optical system includes at least one common optical element receiving the rays of light from the object, at least one splitting element to separate the rays of light in a primary and at least one secondary optical path, at least one reflecting element to orient the rays, at least one element forming an image in the primary path and at least one element forming an image in each secondary path. When an image sensor is located in the common image plane, at least one digital image file can be created from the optical images. Further image processing of the at least one digital image is possible in order to further improve the output from the system.

19 Claims, 7 Drawing Sheets

(58) Field of Classification Search
USPC .................................................. 359/629, 726
See application file for complete search history.

(56)        References Cited

U.S. PATENT DOCUMENTS

| | | | |
|---|---|---|---|
| 5,588,948 | A | 12/1996 | Takahashi et al. |
| 5,734,507 | A | 3/1998 | Harvey |
| 6,271,964 | B1 * | 8/2001 | Abe ....................... G02B 15/10 |
| | | | 359/407 |
| 6,844,990 | B2 | 1/2005 | Artonne et al. |
| 6,865,028 | B2 | 3/2005 | Moustier et al. |
| 7,732,744 | B2 | 6/2010 | Utagawa |
| 2008/0165270 | A1 | 7/2008 | Watanabe et al. |
| 2011/0164108 | A1 | 7/2011 | Bates et al. |
| 2015/0207990 | A1 | 7/2015 | Ford et al. |

FOREIGN PATENT DOCUMENTS

| | | | |
|---|---|---|---|
| EP | 3608717 A1 | 2/2020 | |
| GB | 656908 A | 9/1951 | |
| WO | 0168540 A2 | 9/2001 | |
| WO | WO-2005062105 A1 * | 7/2005 | ............. G02B 17/02 |

OTHER PUBLICATIONS

Extended European Search Report issued May 23, 2025 in EP Application No. 22857997.5.

\* cited by examiner

DUAL FIELD OF VIEW OPTICAL SYSTEM

CROSS-REFERENCE TO RELATED APPLICATIONS

This application claims the benefit of U.S. Provisional Patent Application No. 63/235,405, filed Aug. 20, 2021, entitled "Dual field of view optical system," and of U.S. Provisional Patent Application No. 63/318,874, filed Mar. 11, 2022, entitled "Dual field of view optical system," the entire contents of all of which are incorporated by reference herein.

BACKGROUND OF THE INVENTION

Embodiments of the present invention relate to the field of optical lenses and their design and, more particularly, to an optical system using at least one splitting element in order to create a primary and at least a secondary optical path, each creating an optical image in a single common image plane.

Most existing optical imaging systems create a single optical image having a fixed field of view, greatly limiting the imaging capabilities without trade-off of performance. One such common tradeoff of optical performance is the image resolution vs the image field of view. When a single optical image has a large field of view, it has, as a consequence, a lower number of pixels per degree of the object. When the field of view is narrowed, the resolution in pixels per degree of the object increase, but the smaller field of view creates some blind spots in the object since it is not imaged fully by the lens.

The most common optical system to avoid this trade-off is a zoom system, allowing to adjust the field of view and image resolution. However, zoom systems create a single optical image at a given time and thus cannot be used to image a wide-angle scene and a high-resolution image at the same time.

Another existing type of optical system to avoid this trade-off is a dual imaging system in which two complete optical lenses are used to create a wide-angle image with low resolution and a narrow-angle image with high resolution on a single image sensor. However, these require two complete lenses, each having a different front element spaced from each other, thus creating parallax error between the two optical images since the optical center is different. Such a configuration cannot be used when high precision alignment between the optical center is required.

Optical systems using beam-splitters to separate rays of light from an object and entering the system in a single front element into multiple paths have already been used, like foveated imaging systems or 3-CCD imaging systems. However, these systems have separate image planes which increase the cost and complexity of the devices using them.

The use of controlled distortion, either symmetrical as in U.S. Pat. No. 6,844,990 or asymmetrical as in U.S. Pat. No. 6,865,028 to better control the trade-off between the field of view and the image resolution have already been used in the past. However, this is done with a single optical image and there is a limit to the amount of magnification that can be reached compared to multiples optical images.

Aligning asymmetrical images on a common image sensor with proper mechanical design (inner barrel in an outer barrel) has also been proposed in the past as in U.S. Pat. No. 6,865,028. However, when there are two optical images, in addition to the alignment of the asymmetrical image using known techniques, the focusing of all images in the same plane at the same time as alignment of the asymmetrical image plane with the asymmetrical image sensor is required.

There has therefore been a long felt need for an optical system that can create multiple optical images having different fields of view and different image resolution in a single common image plane, with all images well focused and aligned together.

BRIEF SUMMARY OF THE INVENTION

Embodiments of the present invention overcome the previously mentioned issues with a method to design an optical system creating at least two optical images with different fields of view on a common image plane. The optical system includes at least one common optical element receiving the rays of light from the object, at least one splitting element to separate the rays of light in a primary and at least one secondary optical path, at least one reflecting element to orient the rays, at least one element forming an image in the primary path and at least one element forming an image in each secondary path.

In some embodiments according to the present invention, the aperture stop is located before the splitting element such that both the primary channel aperture stop and the secondary channel aperture stop are the same or at least at the same location when a controllable iris is used to vary the aperture stop size between the channels. In other embodiments, the aperture stop is located after the splitting element and each optical path has its own aperture stop, allowing for more control of their relative amount of light reaching the image sensor.

In some embodiments, the optical axis on the primary path remains in the same direction from the first optical element to the common image plane. In some other embodiments, there is a fold of the optical axis on the primary optical path between the first common optical elements and the common image plane in order to limit the size of the optical system in a given dimension.

In some embodiments according to the present invention, the difference of field of view between the primary optical image and the secondary optical image is at least a factor of 2×. In some other embodiments, it is at least a factor of 4× or a factor of 10×.

In some embodiments according to the present invention, the primary optical path and the at least one secondary optical path have different optical properties other than the field of view. In some embodiments, the f/# of the optical paths are different. In some other embodiments, the color spectrum is different, either by the use of different filters, coatings or materials.

In some embodiments according to the present invention, there is at least one common optical element of any shape that is shared by the primary and a secondary optical path. The most common shape for this common optical element is a freeform element, allowing complete freedom on the surface for each optical path.

In some embodiments, an image sensor is located in the common image plane in order to create at least one digital image file from the optical images. Further image processing of the at least one digital image file is possible in order to further improve the output from the system.

In some embodiments according to the present invention, the mechanical barrel around the optical element has a mechanism to orient the multiple optical images in the common image plane with a non-symmetrical image sensor.

In some embodiments according to the present invention, a focus compensator is used on at least one of the optical paths to make sure the ideal focus positions of all the optical paths are in the common image plane.

In some embodiments according to the present invention, there is more than one splitting element, creating a primary optical path and at least two secondary optical paths.

In some embodiments according to the present invention, the splitting element has an axis of symmetry, either on both sides of a plane or around an axis of revolution.

In some other embodiments, there is at least one secondary optical path comprising more than one reflecting element.

BRIEF DESCRIPTION OF THE DRAWINGS

The foregoing summary, as well as the following detailed description of a preferred embodiment of the invention, will be better understood when read in conjunction with the appended drawings. For illustration purposes, the drawings show an embodiment which is presently preferred. It should be understood, however, that the invention is not limited to the precise arrangements and instrumentalities shown.

In the drawings.

DETAILED DESCRIPTION OF THE INVENTION

The words "a" and "an", as used in the claims and in the corresponding portions of the specification, mean "at least one."

Figure 1A:
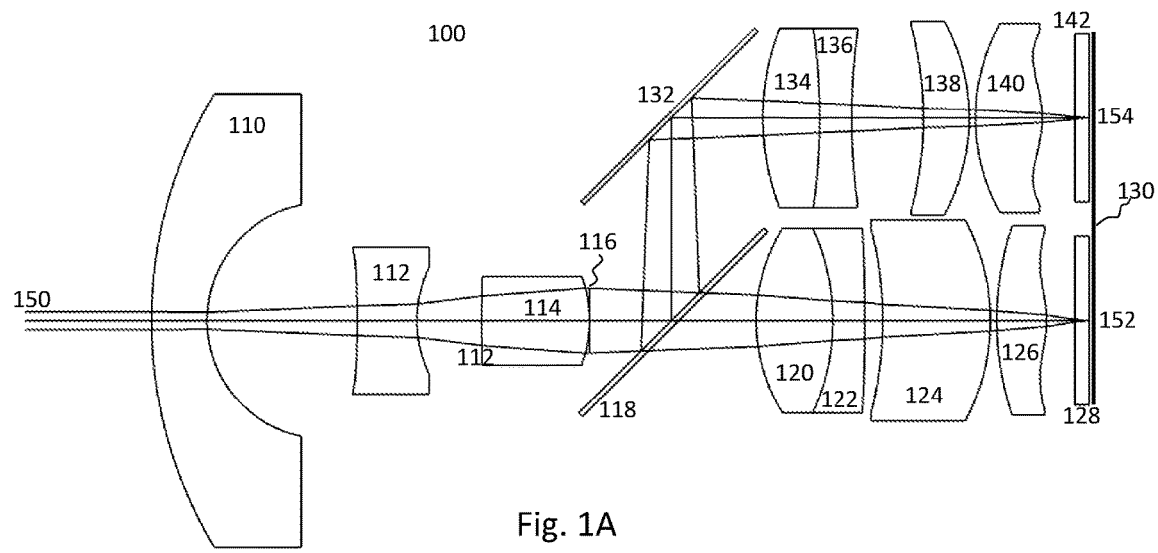
FIGS. 1A-1B show a first embodiment of the optical system with dual optical image on a single image plane with a common aperture.
Figure 1B:
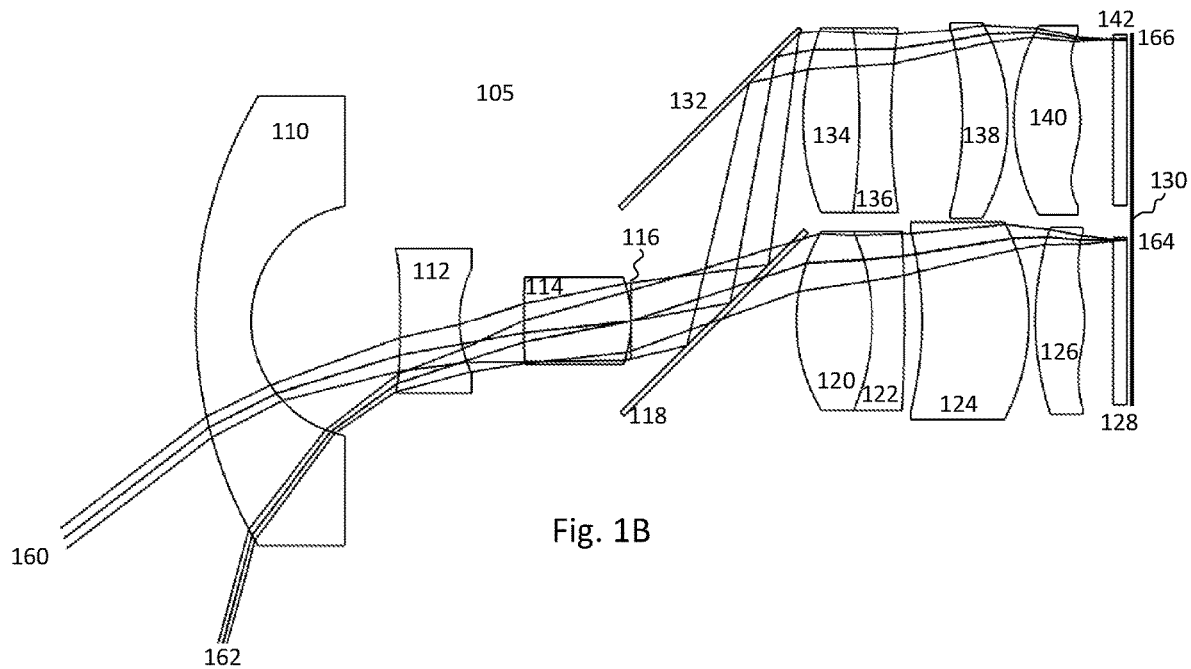

FIGS. 1A and 1B show a first embodiment of the optical system with dual optical image on a single common image plane with a common aperture according to the present invention. The optical system creates a primary path, defined as the optical path with the shortest traveling path on the optical axis from the first optical element to the common image plane, and at least one secondary path, which is any other path longer than the primary path. Both the layout 100 at FIG. 1A and the layout 105 at FIG. 1B show the same optical system, but with rays traced for different fields of view. The layout at 100 shows the rays 150 entering the lens for the central field of view, corresponding to a field angle of 0° for both optical paths, creating the images at 152 for the primary optical path and at 154 for the secondary optical path. Similarly, the layout at 105 shows the rays 160 and 162 entering the lens for the maximum field of view of respectively the secondary optical path and the primary optical path. In this example, the field angle for the rays 160 is 37.5°, creating the image at 166 for the secondary optical path and the field angle for the rays 162 is 75°, creating the image at 164 for the primary optical path. In this example embodiment, in no way limiting the scope of the present invention, the total field of view of the primary image is 150° and the total field of view of the secondary image is 75°. These values for the total field of view could be anywhere from 1° to 300° in other embodiments of the present invention.

In this example embodiment, the difference of field of view between the primary optical image and the secondary optical image is at least a factor of 2×. More generally, the optical system according to the present invention is configured such that the primary optical image has a primary field of view, the at least one secondary optical image has a secondary field of view, and there is at least a factor of 2× between one of the primary field of view and the at least one secondary field of view and the other of the primary field of view and the secondary field of view. In other embodiments, this difference could be at least a factor of 4× or even at least a factor of 10× depending on the magnification required for the secondary field of view compared to the primary field of view. In some other embodiments according to the present invention, the field of view of the primary optical path and the field of view of the secondary optical path could be in a similar range (less than a factor of 2×), but the difference of magnification between the two images is at least a factor of 2× and could be at least a factor of 4× or even at least a factor of 10× in other embodiments. More generally, the optical system according to the present invention is configured such that the primary optical image has a primary magnification, the at least one secondary optical image has a secondary magnification, and wherein there is at least a factor of 2× between one of the primary magnification and the at least one secondary magnification and the other of the primary magnification and the at least one secondary magnification. This case is useful when the invention is used to create images with similar fields of view (or even the same), but of significantly different size. In this case, either the image with the smaller diameter, the image with the larger diameter, or both the images could be at least partially cropped by the image sensor, which is not necessarily centered on any of the primary or secondary optical axis of the system. Because of this potential off-center between the image sensor, the primary optical axis and the secondary optical axis, the optical system can be used in some embodiments with a custom image sensor having a non-linear or a non-symmetrical chief-ray angle pattern defined by micro lens array as part of the image sensor. This custom chief-ray angle pattern on the image sensor can be used to have a better match of chief-ray angle between the optical system and the image sensor at all positions in order to improve the optical performances.

In this example embodiment of FIGS. 1A and 1B, the primary optical path includes nine optical elements and the secondary optical path includes ten optical elements, but these are just example layouts according to the present invention and any number of optical elements can be used for both the primary and the secondary optical path. The optical elements can be of any shape (spherical, aspherical, cylindrical, freeform, Fresnel or any other shape of optical elements), of any type (refractive, reflective, diffractive, meta-surface, liquid crystals, or any other kind of material able to focus rays of light into an optical image) and of any material (glass, plastic, crystal or any other material). In this example, the rays 150 from the central field of view and the rays 160 and 162 for the maximum field of view of the secondary and primary optical path enter the optical system in a single front element 110. In this system, there is at least one common optical element located at a front of the optical system. The rays then pass through any number of elements before an aperture stop or a splitting element. In this example, the lenses 112 and 114 represent these elements, but there could be any number according to the present invention, including zero.

In this example of FIGS. 1A-1B, there is then a single aperture stop 116 in the system, limiting the amount of light that will ultimately reach both the primary and the secondary images. This aperture stop could be of any kind, including a fixed mechanical iris, an electronically controlled iris or the like. Since there is a single aperture stop in FIGS. 1A-1B before the splitting element 118, the entrance pupil is the same for both optical path and the 3 rays shown at 150 (upper marginal ray, chief-ray and lower marginal ray) represent both paths until they are split at the element 118. In the system according to the present invention, there is at least one splitting element, represented here by the element 118. This element is generally a beam splitter that lets a fraction of the light pass or reflect into the primary optical path and reflect or pass another fraction of the light into the secondary path. This splitting element 118 could also be any other kind of optical element able to split the light in more than one direction, including a prism, a diffractive element, a meta surface or the like. The beam splitter 118 could let 50% of the light being transmitted and 50% of the light reflected in some embodiments where the required amount of light is equal in both images, but the fraction could also be different as for example 80% in a path and 20% in another path in some other embodiments. In the primary path, after the splitter element (a transmission in the case of FIGS. 1A-1B), there are any number of optical elements forming the primary image. In this example, there is a doublet formed by elements 120 and 122, the element 124 and the element 126 before a window 128 that can act as a filter, as a sensor coverglass or both. The rays 150 from the center form an image in the image plane 130 at position 152 for the primary image and the rays 162 from the edge of the field of view form an image in the image plane 130 at position 164 for the primary image.

In the secondary path, after the splitter element (a reflection in the case of FIGS. 1A-1B), there are any number of optical elements forming the secondary image. In FIGS. 1A-1B, there is a mirror element 132 putting back the optical axis in the same original direction as before the splitter element 118. In other embodiments, there could be some other optical elements between the splitting element 118 and the mirror 132. In this example, both the splitter element 118 and the mirror element 132 are tilted at 45° with respect to the other optical elements in order to create a 90° bend in the secondary optical path, but this tilt angle could be different than 45° according to the present invention. After the mirror element 132, there are any number of optical elements forming the secondary image. In this example, there is a doublet formed by elements 134 and 136, the element 138 and the element 140 before a window 142 that can act as a filter, as a sensor coverglass or both. The window 142 and the window 128 could be separate windows as in this example of FIGS. 1A-1B or combined into a unique window for the whole image plane as will be shown in the example of FIGS. 2A-2B. A single window is more appropriate in case of a single image sensor and when the filter has the same properties in each of the optical paths. At least two separate windows are more appropriate in case more than one sensor are used in the common image plane or when different filters (spectrum, filtering cut-off) are required.

The rays 150 from the center form an image in the image plane 130 at position 154 for the secondary image and the rays 160 from the edge of the field of view form an image in the image plane 130 at position 166 for the secondary image. The primary optical image footprint half-diameter, measured as the distance from the central image point 152 and the edge image point 164 could be the same or different than the secondary optical image footprint half-diameter, measured as the distance from the central image point 154 and the edge image point 166. In this example, both optical paths have at least 1 doublet element in order to help improve the chromatic performance of the system, but this is not required according to the present invention. In other embodiments, some triplets or more cemented elements could also be used.

The optical system according to the present invention can be used in any part of the electromagnetic spectrum, including, but not limited to, ultraviolet light, visible light, near infrared light, mid infrared light, far infrared light or the like. Depending on the selected part of the electromagnetic spectrum, appropriate choice of material for the optical elements, splitting elements and splitting/merging elements are used. For example, in the far infrared part of the spectrum, where frequencies are in the THz range, material like germanium, zinc selenide, sodium chloride, silicon, zinc sulfide or potassium bromide could be used in order to maximize the transmission in that part of the spectrum.

In summary, the optical system according to the present invention is configured to form a primary and at least one secondary optical image in a common image plane, the optical system including both a primary optical path configured to form the primary optical image at the common optical image plane, wherein the primary optical path includes at least one common optical element, at least one splitting or merging element, a primary channel aperture stop, and one or more optical elements unique to the primary optical path, and at least one secondary optical path configured to form the at least one secondary optical image at the common optical image plane, wherein the secondary optical path includes the at least one common element, the at least one splitting or merging element, at least one reflecting element, a secondary channel aperture stop, and one or more optical elements unique to the at least one secondary optical path.

Figure 2A:
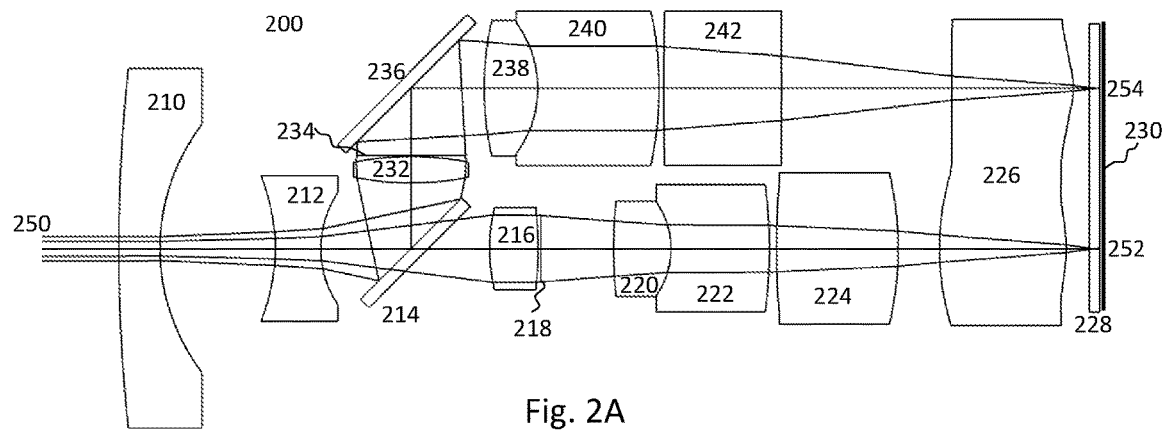
FIGS. 2A-2B show a second embodiment of the optical system with dual optical image on a single image plane with different apertures.
Figure 2B:
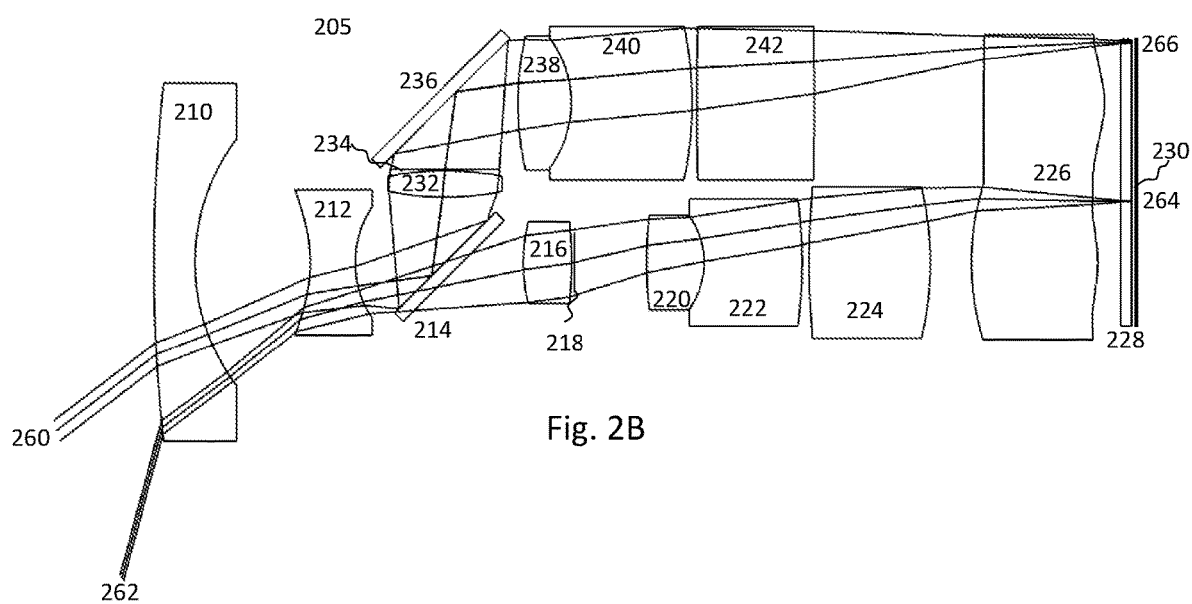

FIGS. 2A-2B show a second embodiment of the optical system with dual optical images on a single image plane with different apertures according to the present invention. The optical system creates a primary path, defined as the optical path with the shortest traveling path on the optical axis from the first optical element to the common image plane, and at least one secondary path, which is any other path longer than the primary path. Both the layout 200 at FIG. 2A and the layout 205 at FIG. 2B show the same optical system, but with rays traced for different fields of view. The layout at 200 shows the rays 250 entering the lens for the central field of view, corresponding to a field angle of 0° for both optical paths, creating the images at 252 for the primary optical path and at 254 for the secondary optical path. Similarly, the layout at 205 shows the rays 260 and 262 entering the lens for the maximum field of view of respectively the secondary optical path and the primary optical path. In this example, the field angle for the rays 260 is 37.5°, creating the image at 266 for the secondary optical path and the field angle for the rays 262 is 75°, creating the image at 264 for the primary optical path. In this example embodiment, in no way limiting the scope of the present invention, the total field of view of the primary image is 150° and the total field of view of the secondary image is 75°. These values for the total field of view could be anywhere from 1° to 300° in other embodiments of the present invention.

In this example embodiment, the difference of fields of view between the primary optical image and the secondary optical image is at least a factor of 2×. In other embodiments, this difference could be at least a factor of 4× or even at least a factor of 10× depending on the magnification required for the secondary field of view compared to the primary field of view. In some other embodiments according to the present invention, the field of view of the primary optical path and the field of view of the secondary optical path could be in a similar range (less than a factor of 2×), but the difference of magnification between the two images is at least a factor of 2× and could be at least a factor of 4× or even at least a factor of 10× in other embodiments. This case is useful when the invention is used to create images with similar fields of view (or even the same), but of significantly different size. In this case, either the image with the smaller diameter, the image with the larger diameter, or both the images could be at least partially cropped by the image sensor, which is not necessarily centered on any of the primary or secondary optical axis of the system. Because of this potential off-center between the image sensor, the primary optical axis and the secondary optical axis, the optical system can be used in some embodiments with a custom image sensor having a non-linear or a non-symmetrical chief-ray angle pattern defined by micro lens array as part of the image sensor. This custom chief-ray angle pattern on the image sensor can be used to have a better match of chief-ray angles between the optical system and the image sensor at all positions in order to improve the optical performance.

In this example embodiment of FIGS. 2A-2B, the primary optical path includes nine optical elements and the secondary optical path includes ten optical elements, but these are just example layouts according to the present invention and any number of optical elements can be used for both the primary and the secondary optical path. The optical elements can be of any shape (spherical, aspherical, cylindrical, freeform, Fresnel or any other shape of optical elements), of any type (refractive, reflective, diffractive, meta-surface, liquid crystals, or any other kind of material able to focus rays of light into an optical image) and of any material (glass, plastic, crystal or any other material). In this example, the rays 250 from the central field of view and the rays 260 and 262 for the maximum field of view of the secondary and primary optical path enter the optical system in a single front element 210. The rays then pass through any number of elements before an aperture stop or a splitting element. In this example, the lens 212 represent these elements, but there could be any number according to the present invention, including zero. In this example of FIGS. 2A-2B, there is then at least one splitting element, represented here by the element 214. This element is generally a beam splitter that lets a fraction of the light pass or reflect into the primary optical path and reflect or pass another fraction of the light into the secondary path. This splitter element 214 could also be any other kind of optical element able to split the light in more than one direction, including a prism, a diffractive element, a meta surface or the likes. The beam splitter 214 could let 50% of the light being transmitted and 50% of the light reflected in some embodiments where the required amount of light is equal in both images, but the fraction could also be different as for example 80% in a path and 20% in another path in some other embodiments. In the primary path, after the splitter element (a transmission in the case of FIGS. 2A-2B), there are any number of optical elements forming the primary image and in the case of the example of FIGS. 2A-2B, there is also an aperture stop 218. The aperture stop 218 is limiting the amount of light that will ultimately reach the primary images. In this example, in addition to the aperture stop, there is after the splitting element 214, the element 216, the doublet formed by elements 220 and 222, the element 224 and the element 226 before a window 228 that can act as a filter, as a sensor coverglass or both.

Similarly in the secondary path, after the splitter element (a reflection in the case of FIGS. 2A-2B), there are any number of optical elements forming the secondary image and in the case of the example of FIGS. 2A-2B, there is also an aperture stop 234. In this example, in addition to the aperture stop 234, there is after the splitting element 214, the element 232, the mirror element 236 putting back the optical axis in the same original direction as before the splitter element 214. In this example, there is at least one secondary optical element 232 located on the secondary optical path between the at least one splitting or merging element and the at least one reflecting element. In this example, both the splitter element 214 and the mirror element 236 are tilted at 45° with respect to the other optical elements in order to create a 90° bend in the secondary optical path, but this tilt angle could be different than 45° according to the present invention. After the mirror element 236, there are any number of optical elements forming the secondary image. In this example, there is a doublet formed by elements 238 and 240, the element 242 and the element 226 before a window 228 that can act as a filter, as a sensor coverglass or both. The window 228 could be combined in a unique window for the whole image plane as shown in this example of FIGS. 2A-2B or separate windows as was shown in the example of FIGS. 1A-1B. A single window is more appropriate in case of a single image sensor and when the filter has the same properties in each of the optical paths. At least two separate windows are more appropriate in case more than one sensor are used in the common image plane or when different filters (spectrum, filtering cut-off) are required.

In FIGS. 2A-2B, since each of the primary optical path and the secondary optical path have a different aperture stop located after the splitting element 214, the entrance pupil can be different for the two optical path, and the 5 rays shown at 250 (upper marginal ray for primary path, upper marginal ray for secondary path, chief-ray for both paths, lower marginal ray for primary path and lower marginal ray for secondary path) show the different rays for both paths until they are split at the element 214. For the primary image, the rays 250 from the center form an image in the image plane 230 at position 252 and the rays 262 from the edge of the field of view form an image in the image plane 230 at position 264. For the secondary image, the rays 250 from the center form an image in the image plane 230 at position 254 and the rays 260 from the edge of the field of view form an image in the image plane 230 at position 266. The primary optical image footprint half-diameter, measured as the distance from the central image point 252 and the edge image point 264 could be the same or different than the secondary optical image footprint half-diameter, measured as the distance from the central image point 254 and the edge image point 266. In this example, both optical paths have at least 1 doublet element in order to help improve the chromatic performance of the system, but this is not required according to the present invention. In other embodiments, some triplets or more cemented elements could also be used.

The optical system according to the present invention can be used in any part of the electromagnetic spectrum, including, but not limited to, ultraviolet light, visible light, near infrared light, mid infrared light, far infrared light or the likes. Depending on the selected part of the electromagnetic spectrum, appropriate choice of material for the optical elements, splitting elements and splitting/merging elements are used. For example, in the far infrared part of the spectrum, where frequencies are in the THz range, material like germanium, zinc selenide, sodium chloride, silicon, zinc sulfide or potassium bromide could be used in order to maximize the transmission in that part of the spectrum.

In the embodiment of FIGS. 2A-2B, the element 226 is a freeform element common to both the primary and the secondary optical path. In other words, in this embodiment, there is at least one of the one or more optical elements unique to the primary optical path and at least one of the one or more optical elements unique to the at least one secondary optical path that are fused together in a common freeform element. In some embodiments according to the present invention, there could be any number of common optical elements of any shape that are shared by more than one optical path. The most common shape for these is a freeform element, allowing complete freedom on the surface for each optical path, but other surface shape could be used, including flat surface in the case of a filter, diffractive surfaces, Fresnel surface or meta-surfaces.

Figure 3A:
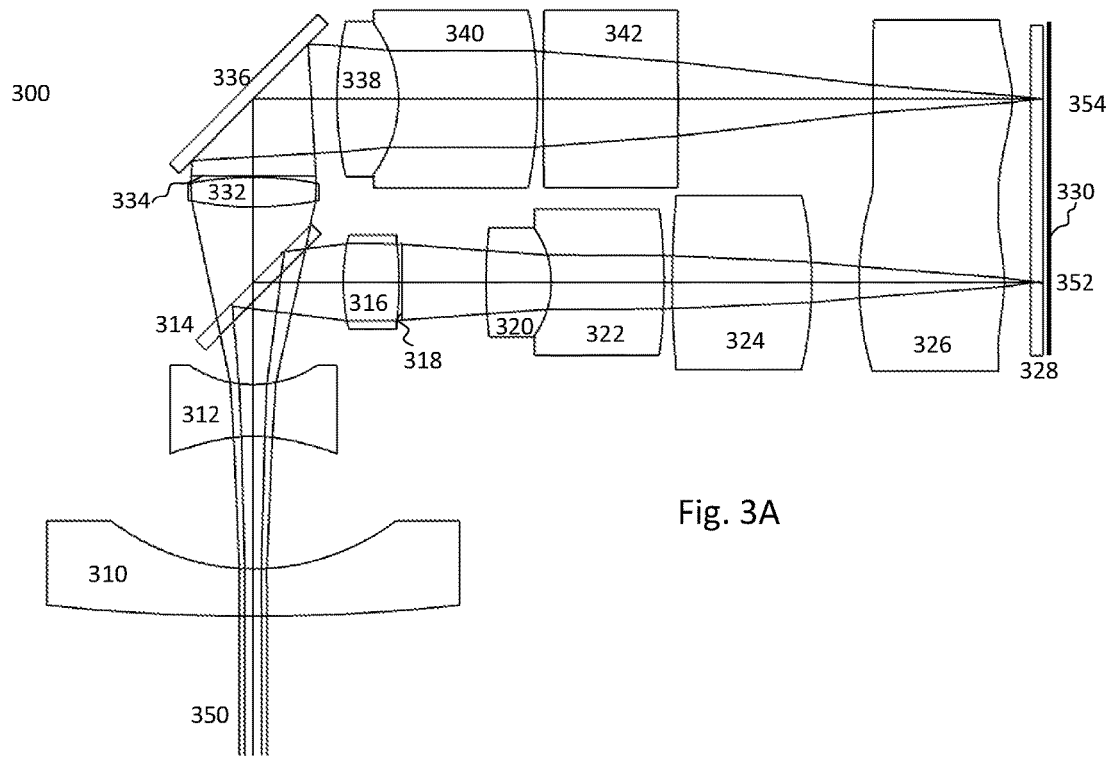
FIGS. 3A-3B show a third embodiment of the optical system with dual optical image on a single image plane with different apertures and a fold of the primary optical path.
Figure 3B:
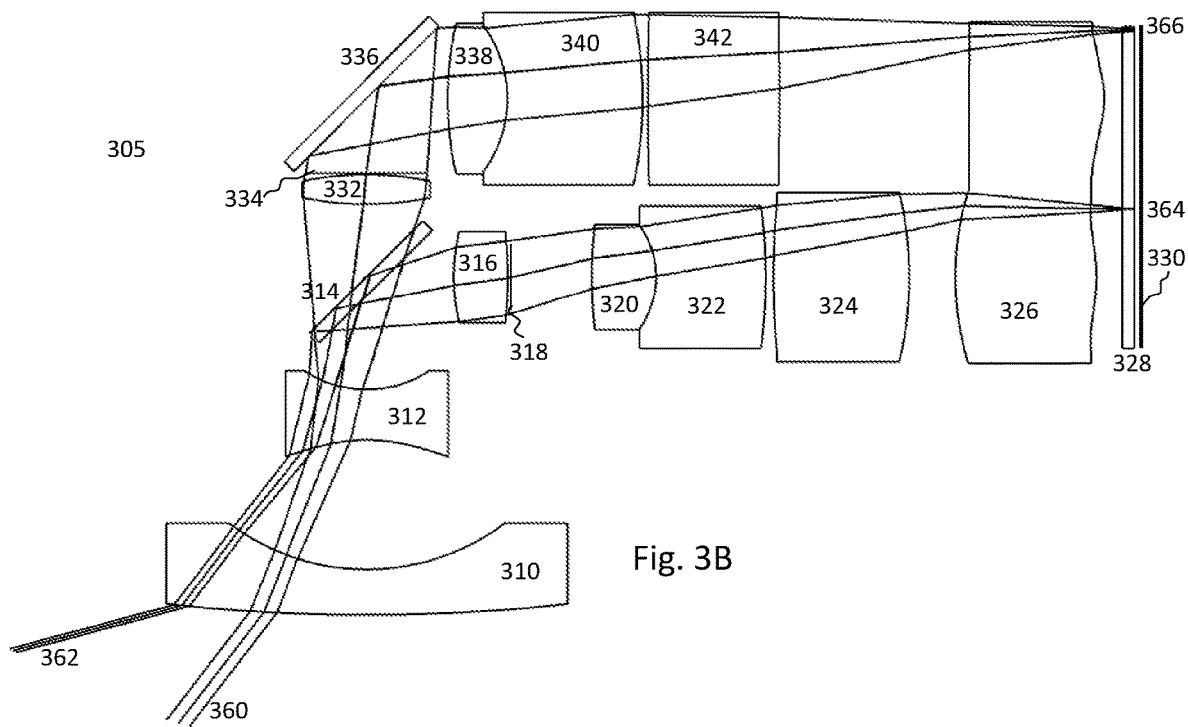

FIGS. 3A-3B show a third embodiment of the optical system with dual optical image on a single image plane with different apertures and a fold of the primary optical path according to the present invention. The optical system creates a primary path, defined as the optical path with the shortest traveling path on the optical axis from the first optical element to the common image plane, and at least one secondary path, which is any other path longer than the primary path. Both the layout 300 at FIG. 3A and the layout 305 at FIG. 3B show the same optical system, but with rays traced for different fields of view. The layout at 300 shows the rays 350 entering the lens for the central field of view, corresponding to a field angle of 0° for both optical paths, creating the images at 352 for the primary optical path and at 354 for the secondary optical path. Similarly, the layout at 305 shows the rays 360 and 362 entering the lens for the maximum field of view of respectively the secondary optical path and the primary optical path. In this example, the field angle for the rays 360 is 37.5°, creating the image at 366 for the secondary optical path and the field angle for the rays 362 is 75°, creating the image at 364 for the primary optical path. In this example embodiment, in no way limiting the scope of the present invention, the total field of view of the primary image is 150° and the total field of view of the secondary image is 75°. These values for the total field of view could be anywhere from 1° to 300° in other embodiments of the present invention.

In this example embodiment, the difference of field of view between the primary optical image and the secondary optical image is at least a factor of 2×. In other embodiments, this difference could be at least a factor of 4× or even at least a factor of 10× depending on the magnification required for the secondary field of view compared to the primary field of view. In some other embodiments according to the present invention, the field of view of the primary optical path and the field of view of the secondary optical path could be in a similar range (less than a factor of 2×), but the difference of magnification between the two images is at least a factor of 2× and could be at least a factor of 4× or even at least a factor of 10× in other embodiments. This case is useful when the invention is used to create images with similar fields of view (or even the same), but of significantly different size. In this case, either the image with the smaller diameter, the image with the larger diameter, or both the images could be at least partially cropped by the image sensor which is not necessarily centered on any of the primary or secondary optical axis of the system. Because of this potential off-center between the image sensor, the primary optical axis and the secondary optical axis, the optical system can be used in some embodiments with a custom image sensor having a non-linear or a non-symmetrical chief-ray angle pattern defined by a micro lens array as part of the image sensor. This custom chief-ray angle pattern on the image sensor can be used to have a better match of chief-ray angles between the optical system and the image sensor at all positions in order to improve the optical performances.

In this example embodiment of FIGS. 3A-3B, the primary optical path includes nine optical elements and the secondary optical path includes ten optical elements, but these are just example layouts according to the present invention and any number of optical elements can be used for both the primary and the secondary optical path. The optical elements can be of any shape (spherical, aspherical, cylindrical, freeform, Fresnel or any other shape of optical elements), of any type (refractive, reflective, diffractive, meta-surface, liquid crystals, or any other kind of material able to focus rays of light into an optical image) and of any material (glass, plastic, crystal or any other material). In this example, the rays 350 from the central field of view and the rays 360 and 362 for the maximum field of view of the secondary and primary optical path enter the optical system in a single front element 310. The rays then pass through any number of elements before an aperture stop or a splitting element. In this example, the lens 312 represents these elements, but there could be any number according to the present invention, including zero. In this example of FIG. 3, there is then at least one ray-splitting element, represented here by the element 314. This element is generally a beam splitter that lets a fraction of the light pass or reflect into the primary optical path and reflect or pass another fraction of the light into the secondary path. This splitter element 314 could also be any other kind of optical element able to split the light in more than one direction, including a prism, a diffractive element, a meta surface or the likes. The beam splitter 314 could let 50% of the light being transmitted and 50% of the light reflected in some embodiments where the required amount of light is equal in both images, but the fraction could also be different as for example 80% in a path and 20% in another path in some other embodiments. In the primary path, after the splitter element (a reflection in the case of FIGS. 3A-3B), there are any number of optical elements forming the primary image and in the case of the example of FIGS. 3A-3B, there is also an aperture stop 318. The aperture stop 318 is limiting the amount of light that will ultimately reach the primary images. In this example, in addition to the aperture stop, there is after the splitting element 314, the element 316, the doublet formed by elements 320 and 322, the element 324 and the element 326 before a window 328 that can act as a filter, as a sensor coverglass or both. Similarly in the secondary path, after the splitter element (a transmission in the case of FIGS. 3A-3B), there are any number of optical elements forming the secondary image and in the case of the example of FIGS. 3A-3B, there is also an aperture stop 334. In this example, in addition to the aperture stop 334, there is after the splitting element 314, the element 332, the mirror element 336 putting back the optical axis in the same original direction as before the splitter element 314. In this example, both the splitter element 314 and the mirror element 336 are tilted at 45° with respect to the other optical elements in order to create a 90° bend in both the primary and the secondary optical path, but this tilt angle could be different than 45° according to the present invention.

After the mirror element 336, there are any number of optical elements forming the secondary image. In this example, there is a doublet formed by elements 338 and 340, the element 342 and the element 326 before a window 328 that can act as a filter, as a sensor coverglass or both. The window 328 could be combined in a unique window for the whole image plane as shown in this example of FIGS. 3A-3B or separate windows as was shown in the example of FIGS. 1A-1B. A single window is more appropriate in case of a single image sensor and when the filter has the same properties in each of the optical paths. At least two separate windows are more appropriate in case more than one sensor is used in the common image plane or when different filters (spectrum, filtering cut-off) are required. In FIGS. 3A-3B, since each the primary optical path and the secondary optical path have a different aperture stop located after the splitting element 314, the entrance pupil can be different for the two optical path and the 5 rays shown at 350 (upper marginal ray for primary path, upper marginal ray for secondary path, chief-ray for both paths, lower marginal ray for primary path and lower marginal ray for secondary path) show the different rays for both paths until they are split at the element 314. For the primary image, the rays 350 from the center form an image in the common image plane 330 at position 352 and the rays 362 from the edge of the field of view form an image in the image plane 330 at position 364. For the secondary image, the rays 350 from the center form an image in the image plane 330 at position 354 and the rays 360 from the edge of the field of view form an image in the image plane 330 at position 366. The primary optical image footprint half-diameter, measured as the distance from the central image point 352 and the edge image point 364 could be the same or different than the secondary optical image footprint half-diameter, measured as the distance from the central image point 354 and the edge image point 366. In this example, both optical paths had at least 1 doublet element in order to help improve the chromatic performance of the system, but this is not required according to the present invention. In other embodiments, some triplets or more cemented elements could also be used.

The optical system according to the present invention can be used in any part of the electromagnetic spectrum, including, but not limited to, ultraviolet light, visible light, near infrared light, mid infrared light, far infrared light or the like. Depending on the selected part of the electromagnetic spectrum, appropriate choice of material for the optical elements, splitting elements and splitting/merging elements are used. For example, in far infrared part of the spectrum, where frequencies are in the THz range, material like germanium, zinc selenide, sodium chloride, silicon, zinc sulfide or potassium bromide could be used in order to maximize the transmission in that part of the spectrum. In the embodiment of FIGS. 3A-3B, the element 326 is a freeform element common to both the primary and the secondary optical path. In some embodiments according to the present invention, there could be any number of common optical elements of any shape that are shared by more than one optical path. The most common shape for these is a freeform element, allowing complete freedom on the surface for each optical path, but other surface shapes could be used, including a flat surface in the case of a filter, diffractive surfaces, Fresnel surface or meta-surfaces.

Figure 4:
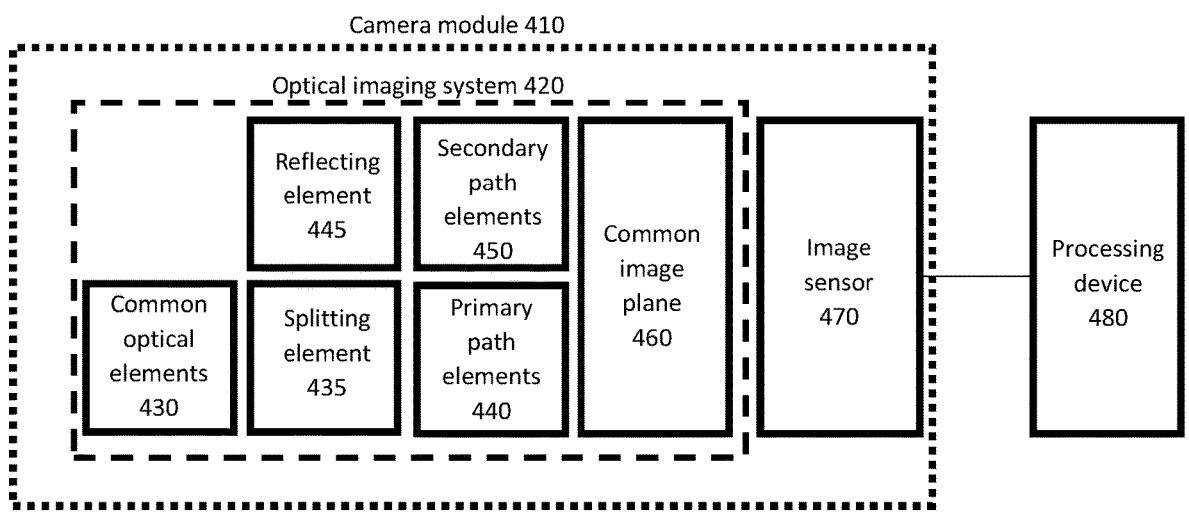
FIG. 4 shows a schematic of the optical imaging lens with a splitting element connected to an image sensor and a processing device.

FIG. 4 shows a schematic of the optical imaging lens connected to an image sensor and a processing device. In all embodiments according to the present invention, there is at least one optical imaging system 420 that includes a section with common optical elements 430 used by all optical paths, a section with at least one splitting element 435 used to split the common optical path in a primary optical path and at least one secondary optical paths, a section with optical elements for the primary path 440 that create an image from the primary path in the common image plane 460, a section with at least one reflecting element 445 that orients the at least one secondary optical path toward the common image plane 460, and a section with optical elements for the secondary path 450 that creates an image from the at least one secondary path in the common image plane 460. In some embodiments, the optical imaging system 420 can be combined to at least one image sensor 470 located at or close to the common image plane 460 in order to form the camera module 410. The image sensor 470 is configured to capture at least a part of the primary optical image and at least a part of the at least one secondary optical image. In some further embodiments, the image sensor of the camera module is configured to convert at least a part of the primary optical image and the at least a part of the at least one secondary optical image to a digital image file that can be further processed by a processing device 480. When the optical system according to the present invention includes a processing device, the processing device is configured to process the digital image file from the at least one image sensor 470 in order to create a processed output. This processed output can be either multiple images showing the multiple images from the multiple optical paths, a combined digital image in which the secondary images generally with higher resolution are fused with the primary image generally with lower resolution or any other kind of processed image using the information captured by the at least one image sensor. The processing can also be used to remove, correct, modify the distortion of the image before displaying in on a display device. The processing device can be hardware executing the processing at the hardware level or a processor (computer, phone, tablet, etc) running software codes in which the processing algorithms have been coded into, no matter what kind of processing is used. This includes also processing by artificial intelligence algorithms that can be executed on any hardware device.

In some embodiments, the image fusion can be used to combine together the pixels from the same field of view in order to increase the signal over noise ratio by adding the light from corresponding pixels together, thus increasing the signal for that pixel. In addition to improving the signal over noise ratio, the image fusion algorithm can also be used to improve the image resolution in the central region of the wide-angle optical image by using the higher resolution image from the narrower field of view image to replace the pixels in the center, thus creating an image with the wide-angle total field of view, but the high resolution in the center. Another kind of processing often required with an optical system according to the present invention is image dewarping, especially of the wider-angle field of view image, in order to remove, reduce or correct possible image distortion often present in wide-angle lenses. This dewarping of at least one of the primary or the secondary images can be useful for example to improve image fusion between the images. Another kind of processing often required with an optical system according to the present invention is to use the dewarped image and/or image fusion in order to create a seamless zoom at the software level, allowing to zoom digitally in the wide-angle image and switching seamlessly to the narrow image when the digital zoom level requires it. Another kind of processing possible with an optical system according to the present invention is to use different light levels on at least two optical images in order to create HDR images from a single capture. This can be done by controlling separately the aperture of each optical path with an adjustable iris or can be done by the splitter element separating the light unequally across the different optical paths. In all of these processing examples, the processed output can then either be displayed using a display device for viewing by a human observer or sent to a further algorithm unit that use the processed image for analyzing its content.

Figure 5A:
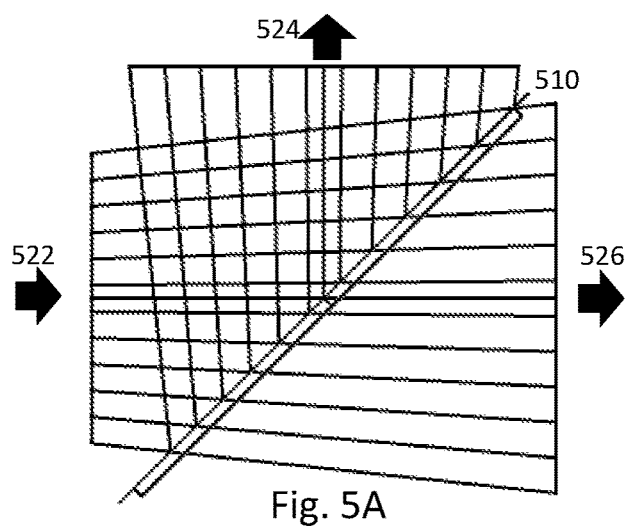
FIGS. 5A-5C show multiples different configurations of a splitting element.
Figure 5B:
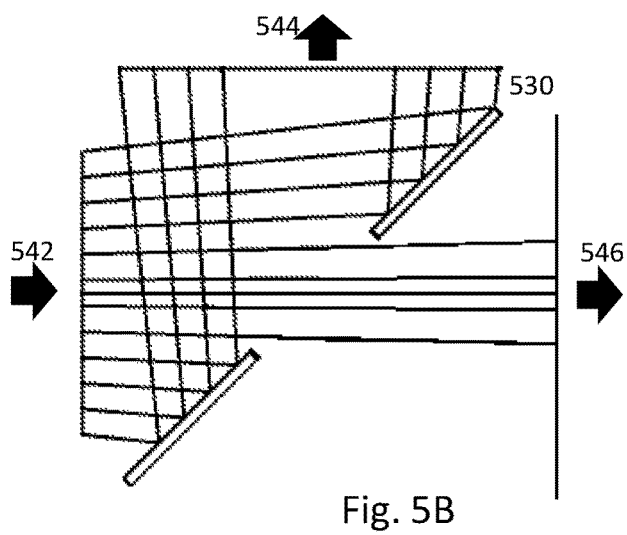
Figure 5C:
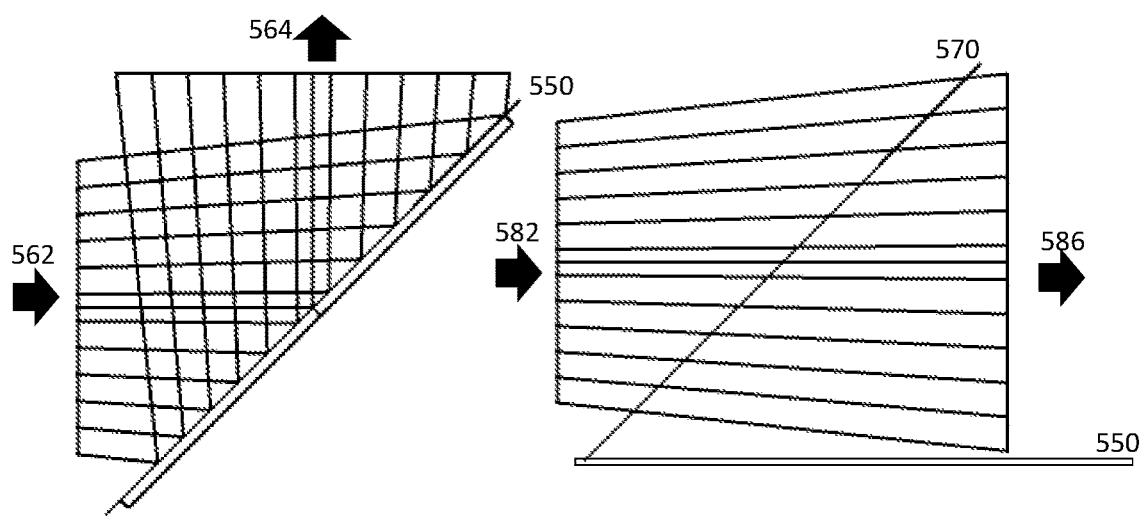

FIGS. 5A-5C show multiples different configurations of a splitting element. At FIG. 5A, the case where the splitting element is a beam splitter 510 is illustrated. The rays come from the direction of the arrow 522 to represent the common optical elements and are split in the primary optical path (represented by the arrow 526) and secondary optical path (represented by the arrow 524) in an amount depending on the reflecting to transmitting ratio of the beam splitter. In some embodiments where the primary and secondary optical path require the same amount of light, the corresponding ratio could be 50:50, meaning that half of the light is reflected, and half of the light is transmitted inside the beam splitter. In other embodiments where the amount of light required is different, for example to equalize the apparent amount of light on the image sensor when the at least two optical paths have different f/#, as would be the case for systems having a common aperture stop in the common path and having two optical paths with highly different focal length due to their difference of magnification created, the ratio of the reflection to the transmission of the beam splitter could be any value between 0.1% and 99.9%.

At FIG. 5B, the case where the splitting element is a reflecting element, generally a mirror, with a hole 530 is illustrated. The hole in the reflecting element could be of any shape, including circular, elliptical, square, rectangular or any other shape depending on which rays need to be transmitted and which need to be reflected. The rays come from the direction of the arrow 542 to represent the common optical elements and are split in the primary optical path (represented by the arrow 546) and secondary optical path (represented by the arrow 544) in an amount depending on the size and shape of the hole in the reflecting element. This holed reflecting element could be useful, for example, in a system in which the at least two optical paths share a common aperture stop and have a significantly different focal length, resulting in different f/#. In order to equalize the amount of light per area on the image plane, a different amount of light can be transmitted and reflected. In some embodiment according to the present invention, the ratio of the area of the hole of the holed reflecting element to the area of the effective (considering where rays of light hit the surface) reflecting region of the holed mirror is equal to the square of the ratio of the f/# of the two optical paths in order to equalize the amount of light per area on the image plane. In other embodiments, instead of being equal to square of the ratio of the f/#, it is equal to the square of the ratio of the focal length f. Similar ratios can be developed when there are more than two optical paths in order to equalize the amount of light per area in at least some sub images created by the optical system. In addition to a holed reflecting element as shown at FIG. 5B, the inverse could also be used, that is a small partial reflecting element reflecting only a part of the beam. This small reflecting element, generally a small mirror, is surrounded by either air or a transparent material.

At FIG. 5C, the case where the splitting element is a movable splitting element 550 is illustrated. The movable splitting element could be a full mirror, a beam splitter, a prism, a holed mirror, a small mirror smaller than the size of the full beam for one of the channels or any other element able to reflect at least in part some rays of light when it is present. The schematic on the left illustrates a first configuration of the movable splitting element 550 placed to reflect the rays from the common optical elements (represented by the arrow 562) into the direction of the secondary optical path (represented by the arrow 564). The schematic on the right illustrates a second configuration of the movable mirror 550 placed to transmit the rays from the common optical elements (represented by the arrow 582) into the direction of the secondary optical path (represented by the arrow 586). The former position of the movable reflecting element 550 is illustrated by the line 570. To move the movable splitting element, any method can be used, including an actuator, a motor, a piston, a human moving it manually or any other way to physically move the optical element. In short, with the optical system according to the present invention, there is at least one splitting or merging element that is one of a beam splitter, a holed reflecting element, a small partial reflecting element or a movable reflecting element.

Figure 6:
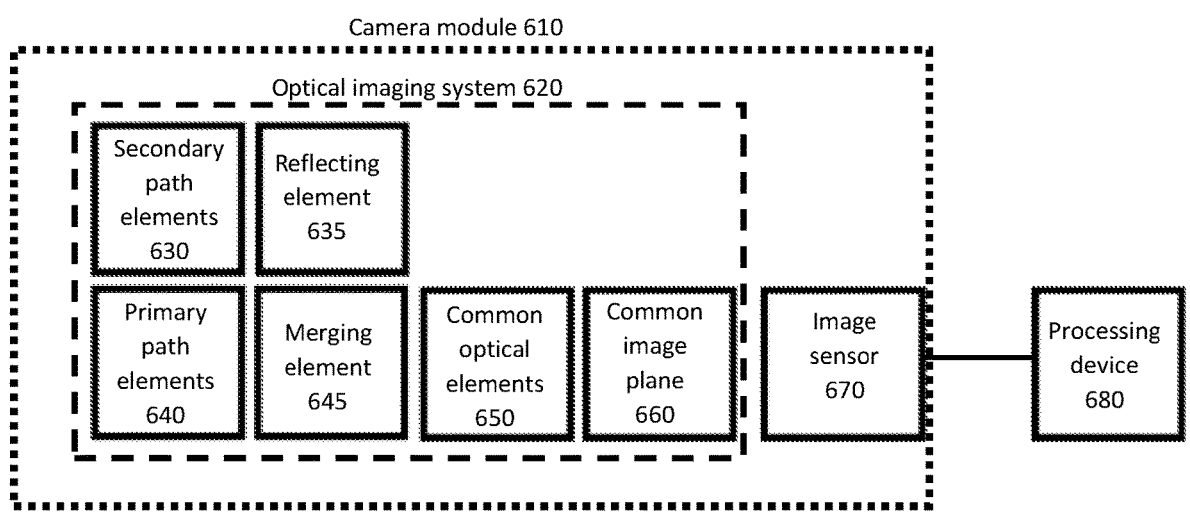
FIG. 6 shows an alternate schematic of the optical imaging lens with a merging element connected to an image sensor and a processing device.

FIG. 6 shows an alternate schematic for an alternate optical imaging lens connected to an image sensor and a processing device according to the present invention. In this alternate construction, there is at least one optical imaging system 620 that includes two different frontal groups, the frontal group with the primary path elements 640 and the frontal group with the secondary path elements 630. Both of these frontal groups each receive light from the object scene separately using at least one optical element. The light from the secondary path elements 630 is then directed on the reflecting element 635 in order to redirect it onto the merging element 645. The merging element 645 used here is similar to the splitting element used in previous embodiments like an optical beam splitter with any transmission and reflection % as previously explained, except that its role is now to merge the two beams into a single common path instead of dividing a single common path into two beams. The light from the primary path elements 640 is also directed onto the merging element 645 where it is merged together with the light from the secondary path. After the merging element, there is at least one optical element as part of the common optical elements group 650 that forms both the primary and the secondary images on the common image plane 660. The two images created in the common image plane can be located at different positions on that image plane so that they don't overlap at all. Alternatively, in other embodiments, the primary optical image and the at least one secondary optical image at least partially overlap in the common image plane. This could even be a full overlap in some embodiments. In some embodiments, the optical imaging system 620 can be combined to at least one image sensor 670 located at or close to the common image plane 660 in order to form the camera module 610. In some further embodiments, the camera module transforms the primary and the secondaries optical images into at least one digital image file that can be further processed by a processing device 680. The processing device can be used to process the digital image from the at least one image sensor 670 in order to create a processed output. This processing according to the embodiment of FIG. 6 can be the same as the processing already described in the description of FIG. 4.

Figure 7:
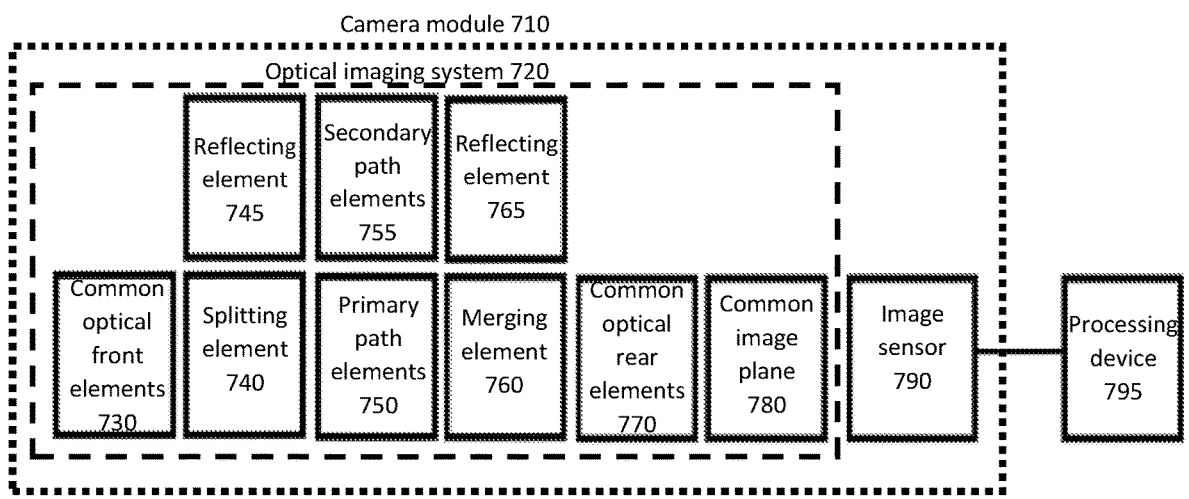
FIG. 7 shows another alternate schematic of the optical imaging lens with both a splitting and a merging element connected to an image sensor and a processing device.

FIG. 7 shows another alternate schematic for an alternate optical imaging lens with both a splitting element and a merging element connected to an image sensor and a processing device according to the present invention. In other words, the at least one splitting or merging element in the optical system according to the present invention includes exactly one splitting element and exactly one merging element. In this alternate construction, there is at least one optical imaging system 720 that includes a common optical front element 730 with at least one optical element directing the light toward a splitting element 740. From the splitting element 740, the light transmitted is then directed to the primary path elements 750 before being directed to the merging element 760. Also from the splitting element 740, the light reflected is then directed to a first reflecting element 745, then to the secondary path elements 755, then to a second reflecting element 765 before being directed also on the merging element 760. The splitting element 740, the merging element 760 and the reflecting elements 745 and 765 can used here are all similar to the element used in previous embodiments. After the merging element, there is at least one optical element as part of the common optical rear elements group 770 that forms both the primary and the secondary images on the common image plane 780. The two images created in the common image plane can be located at different position on that image plane so that they don't overlap at all. Alternatively, in other embodiments, they can have a partial overlap or a full overlap. In some embodiments, the optical imaging system 620 can be combined to at least one image sensor 790 located at or close to the common image plane 780 in order to form the camera module 710. In some further embodiments, the camera module transforms the primary and the secondary optical images into at least one digital image file that can be further processed by a processing device 795. The processing device can be used to process the digital image from the at least one image sensor 790 in order to create a processed output. This processing according to the embodiment of FIG. 7 can be the same as the processing already described in the description of FIGS. 4 and 6.

In some embodiments according to the present invention, the primary optical path and the at least one secondary optical path have different optical properties other than the field of view. In some embodiments, the f/# of the optical paths are different. In some other embodiments, the primary optical image and the at least one secondary optical image have a different color spectrum, either by the use of different filters, coating or materials. For example, one optical path could be imaging in the visible and the other optical path could be imaging in the IR with proper filters. This could even be done on a single image sensor able to image both the visible and IR part of the spectrum. The color separation for different spectrums could be created by the splitting or merging element, for example by using a mirror made of a material transparent in one part of the spectrum (to allow the rays to go straight in that part of the spectrum) and reflective in another part of the spectrum (to allow the rays to go in a secondary path in that part of the spectrum), allowing to keep in both spectrum 100% (or a high percentage with an imperfect system) of the rays of light in each part of the spectrum contrary to an ordinary beam splitter only letting through a part of the rays in each direction. In some other embodiments, the fields of view of the primary and the secondary path are equal or similar (FoV values are within ±20%). In these cases, the focal length of either the primary path or the secondary path could be at least 1.5 times bigger than the other in order to create images of different sizes on the image plane.

In some embodiments according to the present invention, the mechanical barrel around the optical element has a mechanism to orient the multiple optical images in the common image plane with a non-symmetrical image sensor (often rectangular in shape). One example of such a mechanism is to use an inner barrel inside an outer barrel, the inner one being used to rotate the optical imaging system to the desired orientation and the outer barrel being used to position the optical system with respect to at least one image sensor. These include simple focus adjustment by screwing the outer barrel in a lens holder or more generally 6-axis alignment of the optical system with an image sensor using active alignment techniques. In some other embodiments, the mechanical barrel includes optical baffles in order to block some stray light, including potentially blocking the unwanted light from the primary path to reach at least one of the secondary images or blocking the unwanted light from at least one of the secondary paths to reach the primary image.

In some embodiments according to the present invention, the optical system is configured such that at least one of the primary optical path or the at least one secondary optical path includes a focus compensator. This focus compensator is used on at least one of the optical paths to make sure the ideal focus positions of all the optical paths are in the common image plane. This focus compensation can be done by moving one optical element or a group of optical elements. This focus compensation can also be done in some other embodiments by adjusting the distance between the splitting element and the reflecting element. When such a focus compensation is not present, the common image plane can use multiple image sensors that are slightly shifted to accommodate for the changes of focus position or if a single image sensor is used, a best average focus position of the multiple optical images is selected.

In some embodiments according to the present invention, the at least one image sensor located in the common image plane includes multiple sensor arrays, either as part of a single image sensor or multiple image sensors, with a gap of some pixels between the arrays. When these arrays are part of a single image sensor, they can be positioned in square tiles, rectangular tiles or in any other shape. This gap can be as small as 1 pixel or as big as required in some applications, but it is generally less than 250 pixels wide. Each individual array of the at least one image sensor can be read independently, with different reading resolution or reading speed (for example, in frame per seconds). In some other embodiments, the chief-ray angle of each array (due to the position of microlens on top of the pixels from the arrays) of these image sensors could each have its own central point of symmetry.

In some embodiments according to the present invention, there is more than one splitting element, and the optical system includes a plurality of secondary optical paths, each of the secondary optical paths being configured to enable formation of its own secondary optical image at the common image plane. One such configuration is where two splitting elements are on the primary optical path, the first one redirecting some rays of light toward a first reflecting element for example in a positive Y direction and then the second splitting element redirecting some other rays of light toward a second reflecting element for example in a negative Y direction. One other configuration is when a first splitting element splits rays into a primary optical path and into multiple successive secondary paths. In the axis perpendicular to the optical axis of the primary path, at the position where a reflecting element is located when there are exactly two optical paths, a splitting element is instead located to redirect some rays of light in a first secondary optical path having an optical axis parallel to the optical axis of the primary path and some other rays of light in a second secondary optical path with a reflecting element required to redirect its optical axis in a direction parallel to the optical axis of the primary path. Such cascade of optical paths is not limited to three optical paths and there could be N number of such optical paths in cascade with N−1 splitting elements in all optical paths before the last and 1 reflecting element for the last optical path. In this case, having splitter elements with transmission and reflection ratio different than 50:50 is important to make sure that all secondaries optical paths have enough light reaching the image plane.

In some embodiments according to the present invention, the splitting element has an axis of symmetry. When the symmetry is a plane symmetry for example to split rays in the Y direction, the splitting element split the secondary rays of light in both the positive Y direction and the negative Y direction. When the symmetry is a rotational symmetry around the optical axis of the common lens elements, as with a partially transparent and partially reflecting axicon, the splitting element split symmetrically the secondary rays in all directions around the primary optical path, allowing to create in the common image plane a secondary image that is located all around the primary image.

In some embodiments, there is at least one secondary optical path comprising more than one reflecting element. In the examples of FIGS. 1A-1B and of FIGS. 2A-2B, the rays of light moved on the optical axis from the object to the image, illustrated from left to right when the optical axis is horizontal and from bottom to top when the optical axis is vertical. When there is at least one secondary optical path including more than one reflecting element, the rays on the optical axis can travel in any direction, including, but not limited to, from the right to the left. This allows the optical path length to increase until the last reflecting element that orients the final image in the common image plane. Increasing the optical path length of a secondary optical path compared to the primary optical path is used to increase the focal length of the secondary optical path compared to the focal length of the primary optical path, which allows creation of a larger difference between the wider field of view and the narrower field of view.

In some embodiments, the optical system is configured such that the primary optical image has a primary image diameter, the at least one secondary optical image has a secondary image diameter, and wherein the primary image diameter is the same value as the secondary image diameter. In other embodiments, the primary image diameter and the secondary image diameter are within 10% of each other's. In some other embodiments, there is at least a factor of 2× between one of the primary image diameter and the at least one secondary image diameter and the other of the primary image diameter and the secondary image diameter. In some other embodiments, there could be a factor of 4× or even of 10× between the smaller and the larger image diameter.

In some embodiments, both the primary optical image and the secondary optical image overlap at least in part on the image sensor, either because the sum of the two image half-diameters of the sub-images is larger than the distance between the two centers of the images or because at least one reflecting element redirects one of the images in part on top of another image. In these cases, the individual information for each image could be retrieved via image processing. Alternatively, the optical system could be used to allow only one of the overlapping images to reach the common image plane at a time, for example by the use of electronically controllable iris or shutter closing or opening to block or let the light reach the image plane. The iris or shutter could be synced with the image sensor in video mode so that one first frame out of two is with a first optical image and the other one frame out of two is with the second optical image. Alternatively, these overlapping images could be in different parts of the color spectrum, as for example they could be in both the visible and the IR part of the spectrum and the image sensor including 4 types of pixels (red, green, blue, IR) could reconstruct the two separate images at the debayering step of processing by separating the RGB information from the IR information. This intentional overlap of the images can be used in compressed sensing applications.

In some embodiments according to the present invention, the aperture of at least one of the primary path or of the secondary path is a controllable IRIS than can be opened or closed by a manual or an electronic control. In some embodiments where the primary image and the secondary image have at least some overlap area in the common image plane, closing or opening the iris can allow the light from one selected path to reach or not the image plane. Allowing the light to reach the image only for one of the primary or the secondary path at a given time with a controllable iris in at least one optical path can be used to avoid overlapping of image to obstruct the view from a desired image by the other undesirable image. This controllable iris can also be used to turn off a channel only for a short time in order to allow the processing unit to record the effect of the other channel and calibrate its image in order to digitally subtract the effect of this image on the combined image at a later time when light from both paths reach the image plane. In some other embodiments, instead of a mechanical iris used to at least partially close at least one of the optical paths, any other optical means can be used to at least partially disable one optical path, including, but in no way limited to, a movable optical element, a mirror able to flip around an axis, an electrically controlled electrical surface like an electrochromic window, a liquid crystal element, or any other element that can be used to block at least partially the light from at least one optical path as needed. In some other embodiments, polarizers are used on the various optical paths so that the light forming an image in the common image plane has a first polarization type or orientation for the primary optical path and a second, different, polarization type or orientation for the secondary optical path.

In some embodiments according to the present invention, at least one of the at least one common optical element, the one or more optical elements unique to the primary optical path, the one or more optical elements unique to the at least one secondary optical path, the at least one splitting or merging optical element, or the at least one reflecting optical element is off-axis, with its central axis off-centered compared to the central axis of other elements in the optical system. This off-centering of at least one optical element can be used in part to help position the at least two optical images at the desired positions on the common optical image plane without having mechanical interference between the optical elements or their mechanical barrels. When off-centered elements are used, some freeform optical elements are optionally used in the optical imaging system in order to keep a good image quality above the desired level in the whole optical image.

In some embodiments according to the present invention, at least one of the primary optical path or the at least one secondary optical path create at least one intermediate image before the common image plane in order to invert the optical image in the common image plane compared to the natural orientation of an optical imaging system without intermediate image. This inversion of at least one image can be used to properly align as desired the at least two images in the image plane depending on the area of interest in both. This image inversion can also be used when an overlap region between the at least two optical image is created to select which part of the field of view is in that overlap. This image inversion can also be used to orient as desired a part of at least one image with vignetting so that it is located in a less important part of the image. Finally, this image inversion with at least one intermediate image can be used in order to increase the optical path length of at least one of the paths in order to allow both the optical paths to converge exactly at the common optical image plane. In that case, even more than a single image inversion could be used in order to extend the optical path as desired.

In some embodiments according to the present invention, at least one of the secondary optical paths has at least one optical element located between the splitting element and the reflecting element or at least one optical element located between the reflecting element and the merging element. This can be used in part to control the size of the light beams and limit the diameter of the optical elements in the secondary path.

In some embodiments according to the present invention, the optical system uses some active optical elements, including, but not limited to, liquid lenses or deformable mirrors. These active optical elements can be controlled either in a closed loop based on the resulting image on the image sensor or in an open loop based on previous calibration of the active element. This active element can be used for example for focus compensation of one optical path with respect to the other in order to make sure their focal plane is exactly the same.

In some embodiments according to the present invention, the optical system is reversed, and the method is used to design and build a projection system with a single common source plane. In this case, the system is using two different optical paths in order to project two different images into the space surrounding the optical system, the two projected images having different optical properties (FoV, f/#, color spectrum, magnification, etc). In some embodiments, this dual projection system is used in a LIDAR system to project two different beams of light from the LIDAR, one with a narrow field of view used for lighting objects at a long distance from the LIDAR and one with a larger field of view used for lighting objects closer to the LIDAR, both at the same time to be imaged back with an optical system. This dual image projection system can even be used in collaboration with a dual imaging system according to the preferred embodiments in order to light and image back a scene.

There are multiple applications for the optical system according to the present invention, including automotive lenses, security and surveillance lenses, industrial imaging lenses, consumer and prosumer electronic devices or any other application requiring at least two optical images from a single front element and with a single common image plane.

The present invention showed an optical system creating at least two images in a common image plane. The invention is also about a method for building an optical imaging system configured to form at least two optical images in a common image plane, the method comprising the following steps. The first step is providing a primary optical path to enable the formation of a primary optical image at the common optical image plane, the primary optical path including at least one common optical element, at least one splitting or merging element, a primary channel aperture stop, and one or more optical elements unique to the primary optical path. The second step is providing at least one secondary optical path to enable the formation of at least one secondary optical image at the common optical image plane, the at least one secondary optical path including the at least one common optical element, the at least one splitting or merging element, at least one reflecting element, a secondary channel aperture stop, and one or more optical elements unique to the at least one secondary optical path. The invention is also about a method for forming the at least two optical images in a common image plane, the method comprising the following steps. The first step is forming, using a primary optical path, a primary optical image at the common optical image plane, the primary optical path including at least one common optical element, at least one splitting or merging element, a primary channel aperture stop, and one or more optical elements unique to the primary optical path. The second step is forming, using at least one secondary optical path, at least one secondary optical image at the common optical image plane, the at least one secondary optical path including the at least one common optical element, the at least one splitting or merging element, at least one reflecting element, a secondary channel aperture stop, and one or more optical elements unique to the at least one secondary optical path.

All of the above figures and examples show the optical system and method to design an optical system with dual field of view on a common image plane using at least one splitting element and at least one reflecting element. These examples are not intended to be an exhaustive list or to limit the scope and spirit of the present invention. It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An optical imaging system configured to form a primary and at least one secondary optical image in a common image plane, the optical system comprising:
   a. a primary optical path configured to form the primary optical image at the common optical image plane, wherein the primary optical path includes at least one common optical element, at least one splitting or merging element, a primary channel aperture stop, and one or more optical elements unique to the primary optical path;
   b. at least one secondary optical path configured to form the at least one secondary optical image at the common optical image plane, wherein the secondary optical path includes the at least one common element, the at least one splitting or merging element, at least one reflecting element, a secondary channel aperture stop, and one or more optical elements unique to the at least one secondary optical path; and
   c. a single image sensor at the common image plane, the single image sensor being configured to capture at least a part of the primary optical image and at least a part of the at least one secondary optical image.

2. The optical system of claim 1, further comprising a processing device, and wherein the image sensor is configured to convert the at least a part of the primary optical image and the at least a part of the at least one secondary optical image to a digital image file, the processing device being configured to process the digital image file.

3. The optical system of claim 1, further comprising a plurality of secondary optical paths, each of the secondary optical paths being configured to enable formation of its own secondary optical image at the common image plane.

4. The optical system of claim 1, wherein at least one of the one or more optical elements unique to the primary optical path and at least one of the one or more optical elements unique to the at least one secondary optical path are fused together in a common freeform element.

5. The optical system of claim 1, wherein the at least one splitting or merging element is one of a beam splitter, a holed reflecting element, a small partial reflecting element or a movable reflecting element.

6. The optical system of claim 1, wherein at least one of the primary optical path or the at least one secondary optical path includes a focus compensator.

7. The optical system of claim 1, wherein the primary optical image has a primary field of view, the at least one secondary optical image has a secondary field of view, and wherein there is at least a factor of 2× between one of the primary field of view and the at least one secondary field of view and the other of the primary field of view and the secondary field of view.

8. The optical system of claim 1, wherein the primary optical image has a primary magnification, the at least one secondary optical image has a secondary magnification, and wherein there is at least a factor of 2× between one of the primary magnification and the at least one secondary magnification and the other of the primary magnification and the at least one secondary magnification.

9. The optical system of claim 1, wherein the primary optical image has a primary image diameter, the at least one secondary optical image has a secondary image diameter, and wherein the primary image diameter is the same value as the secondary image diameter.

10. The optical system of claim 1, wherein both the primary channel aperture stop and the secondary channel aperture stop are the same.

11. The optical system of claim 1, wherein the at least one common optical element is located at a front of the optical system.

12. The optical system of claim 1, wherein the primary optical image and the at least one secondary optical image have a different color spectrum.

13. The optical system of claim 1, wherein the at least one splitting or merging element includes exactly one splitting element and exactly one merging element.

14. The optical system of claim 1, wherein the primary optical image and the at least one secondary optical image at least partially overlap in the common image plane.

15. The optical system of claim 1, wherein at least one of the at least one common optical element, the one or more optical elements unique to the primary optical path, the one or more optical elements unique to the at least one secondary optical path, the at least one splitting or merging optical element, or the at least one reflecting optical element has a central axis that is off-centered compared to central axes of other elements in the optical system.

16. The optical system of claim 1, wherein at least one of the primary optical path or the at least one secondary optical path create at least one intermediate image before the common image plane.

17. The optical system of claim 1, wherein there is at least one secondary optical element located on the secondary optical path between the at least one splitting or merging element and the at least one reflecting element.

18. A method of building an optical imaging system configured to form at least two optical images in a common image plane, the method comprising:
   a. providing a primary optical path to enable the formation of a primary optical image at the common optical image plane, the primary optical path including at least one common optical element, at least one splitting or merging element, a primary channel aperture stop, and one or more optical elements unique to the primary optical path;
   b. providing at least one secondary optical path to enable the formation of at least one secondary optical image at the common optical image plane, the at least one secondary optical path including the at least one common optical element, the at least one splitting or merging element, at least one reflecting element, a secondary channel aperture stop, and one or more optical elements unique to the at least one secondary optical path; and
   c. providing a single image sensor at the common image plane, the single image sensor being configured to capture at least a part of the primary optical image and at least a part of the at least one secondary optical image.

19. A method for forming at least two optical images in a common image plane, the method comprising:
   a. forming, using a primary optical path, a primary optical image at the common optical image plane, the primary optical path including at least one common optical element, at least one splitting or merging element, a primary channel aperture stop, and one or more optical elements unique to the primary optical path;
   b. forming, using at least one secondary optical path, at least one secondary optical image at the common optical image plane, the at least one secondary optical path including the at least one common optical element, the at least one splitting or merging element, at least one reflecting element, a secondary channel aperture stop, and one or more optical elements unique to the at least one secondary optical path; and
   c. forming, using a single image sensor at the common image plane, at least one digital image file by capturing at least a part of the primary optical image and at least a part of the at least one secondary optical image.

* * * * *